United States Patent
Schmitt et al.

(10) Patent No.: US 9,492,868 B2
(45) Date of Patent: Nov. 15, 2016

(54) PROCESS FOR PRODUCING A LEAD-FREE SLIDING BEARING MATERIAL

(75) Inventors: Holger Schmitt, Pfungstadt (DE); Daniel Meister, Mainz-Kastel (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 493 days.

(21) Appl. No.: 14/111,629

(22) PCT Filed: Dec. 28, 2011

(86) PCT No.: PCT/EP2011/074155
§ 371 (c)(1),
(2), (4) Date: Dec. 11, 2013

(87) PCT Pub. No.: WO2012/139671
PCT Pub. Date: Oct. 18, 2012

(65) Prior Publication Data
US 2014/0086784 A1    Mar. 27, 2014

(30) Foreign Application Priority Data

Apr. 14, 2011 (DE) .......... 10 2011 007 362

(51) Int. Cl.

| | | |
|---|---|---|
| B22F 9/04 | (2006.01) | |
| B22F 9/02 | (2006.01) | |
| B22F 9/08 | (2006.01) | |
| C22C 1/04 | (2006.01) | |
| C22C 1/10 | (2006.01) | |
| C22C 9/00 | (2006.01) | |
| C22C 9/01 | (2006.01) | |
| F16C 33/14 | (2006.01) | |
| B22F 1/00 | (2006.01) | |

(52) U.S. Cl.
CPC .............. *B22F 9/02* (2013.01); *B22F 1/0081* (2013.01); *B22F 9/082* (2013.01); *C22C 1/0425* (2013.01); *C22C 1/1042* (2013.01); *C22C 9/00* (2013.01); *C22C 9/01* (2013.01); *F16C 33/14* (2013.01); *Y02T 10/865* (2013.01)

(58) Field of Classification Search
None
See application file for complete search history.

(56) References Cited

U.S. PATENT DOCUMENTS

| | | | | |
|---|---|---|---|---|
| 5,017,250 A | * | 5/1991 | Ashok | B22D 23/003 148/411 |
| 5,938,864 A | * | 8/1999 | Tomikawa | C22C 9/06 148/434 |
| 6,165,246 A | | 12/2000 | Kira et al. | |
| 2007/0057238 A1 | * | 3/2007 | Matsuki | C22C 1/0425 252/514 |
| 2009/0010797 A1 | * | 1/2009 | Aruga | C22C 9/00 420/472 |
| 2010/0002968 A1 | | 1/2010 | Mergen | |
| 2011/0206939 A1 | * | 8/2011 | Imai | B32B 15/013 428/553 |

FOREIGN PATENT DOCUMENTS

| | | |
|---|---|---|
| DE | 4415627 C1 | 8/1995 |
| DE | 69807848 T2 | 8/2003 |
| EP | 0795693 A2 | 9/1997 |
| EP | 0962541 A1 | 12/1999 |
| EP | 2166117 A1 | 3/2010 |
| JP | H04242228 A | 8/1992 |
| JP | H07118777 A | 5/1995 |
| JP | H11124646 A | 5/1999 |
| JP | 2003073789 A | 3/2003 |
| JP | 2010501816 A | 1/2010 |
| WO | 2010/128076 A1 | 11/2010 |

* cited by examiner

*Primary Examiner* — George Wyszomierski
*Assistant Examiner* — Ngoclan T Mai
(74) *Attorney, Agent, or Firm* — Robert L. Stearns; Dickinson Wright, PLLC

(57) ABSTRACT

In a process for producing a lead-free sliding bearing material, a material which is based on copper and contains iron and phosphorous is atomized to form a powder.

13 Claims, No Drawings

PROCESS FOR PRODUCING A LEAD-FREE SLIDING BEARING MATERIAL

RELATED APPLICATIONS

This application is the U.S. National Phase under 35 U.S.C. 371 of International Application No. PCT/EP2011/074155 filed Dec. 28, 2011, which in turn claims the benefit of German Application No. 10 2011 007 362, filed on Apr. 14, 2011, the disclosures of which Applications are incorporated by reference herein.

BACKGROUND OF THE INVENTION

Technical Field

The invention relates to a process for producing a lead-free sliding bearing material.

A wide variety of requirements are placed on sliding bearings. These concern, for example, the corrosion resistance, the sliding properties and the machinability.

Prior Art

DE 10 2007 049 383 A1 relates to a composite material and a method for the production thereof, which consists of a steel substrate and a coating of a hardenable copper alloy that is applied by means of roll bonding.

Apparent from DE 10 2005 014 302 A1 is a method for the production of a sliding bearing made of a copper-multicomponent alloy, in which at least one phase constituent at the sliding surface is dissolved out by means of an acid.

EP 0 962 541 A1 relates to a sintered sliding bearing material based on copper, which has particles with two different degrees of hardness.

SUMMARY OF THE INVENTION

The object forming the basis for the invention is to provide a process for the production of a sliding bearing material, by means of which sliding bearings having improved properties, in particular as regards corrosion resistance and/or sliding properties, can be produced in an efficient manner.

Accordingly, a lead-free, copper-based material containing iron and phosphorous is atomized to form a powder. Iron and phosphorous advantageously form hard particles of the type $Fe_2P$ and/or $Fe_3P$, which unfold in the sliding bearing material produced according to the invention their advantages with regard to wear resistance and the effect as chip breakers. In particular, the high thermal conductivity of said copper matrix, which is not significantly impaired by the addition of said further elements, in particular in comparably low concentrations, can be used in this regard.

It has been found that the novel material can be processed in existing sintering plants at a sintering temperature of up to 1000° C.

After atomization, preferably at least one of the elements aluminum, magnesium, silicon, titanium, zircon, chrome, manganese, zinc, nickel and molybdenum is added as powder and mixed with the CuFeP powder. Said elements act advantageously as corrosion inhibitors and accordingly reduce the corrosion sensitivity of the copper matrix, in particular when a distribution as homogeneous as possible of said elements in the matrix is ensured.

For the iron and phosphorous concentrations, values between 2.1% and 2.6 or 0.015% and 0.15% (percent by weight) have turned out to be favorable.

It was furthermore found in initial tests that the desired protection against corrosion already occurs at 0.1% to 3%, and in particular at concentrations of said elements of at least 0.1% and/or at most 1%. Presently, aluminum and/or magnesium are preferred for this.

The sliding properties and the machinability of the sliding bearing material produced according to the invention can be improved in an advantageous manner by adding hard particles, such as, for example, oxides, carbides, nitrides and phosphides, and/or solid lubricants, such as, for example, h-BN and carbon, in particular graphite, when producing the powder for the sintering process. Furthermore, at least one of the chip-breaking elements tellurium, bismuth, lead and sulfur can be added as so-called chip breaker in a process prior to sintering. In particular, solid lubricants, hard particles, chip breakers, etc. can be introduced in order to optimize the produced material in an application-oriented manner. Preferred hard particles are, for example, Al2O3, c-BN, MoSi2, ZrO2, SiO2 and all carbides of said corrosion-preventing metals.

For the mixing of said materials, a ball mill is presently preferred, which additionally effects a milling process.

It is possible to lower the sintering temperature in an advantageous manner by the preferred targeted increase of the fine proportion, i.e. particles of <5 µm, to at least 5%. This furthermore offers the advantage that the technically necessary high proportion of fine powder can be used within the scope of the invention without negatively affecting the flow properties.

The further processing of the material according to the invention is carried out preferably by sintering, casting or roll bonding. With casting, it is advantageous that powder does not necessarily have to be produced first. With sintering, subsequent rolling and/or heat treatment steps are omitted and this is advantageous.

The invention claimed is:

1. A process for producing a lead-free sliding bearing material comprising: preparing a powder by atomizing, a material which is based on copper and contains iron and phosphorous, wherein after atomizing, combining the powder material with a total of at least 0.1% by weight of at least one of the elements aluminium, magnesium, silicon, titanium, zirconium, chromium, manganese, zinc, nickel and molybdenum provided in powder form and thereafter mixing and milling the combined powder material and the at least one powder element.

2. The process according to claim 1, wherein the material contains 2.1% to 2.6% by weight of iron and/or 0.015% to 0.15% by weight of phosphorous.

3. The process according to claim 1, wherein the material is mixed with a total of a maximum 3%, by weight of the elements aluminium, magnesium, silicon, titanium, zircon, chrome, manganese, zinc, nickel and molybdenum.

4. The process according to claim 3, wherein there is a minimum of said elements of 1% by weight.

5. The process according to claim 1, wherein the material is furthermore mixed with a solid lubricant.

6. The process of claim 5, wherein the solid lubricant is selected from at least one of h-BN or C.

7. The process according to claim 1, wherein the material is furthermore mixed with hard particles.

8. The process of claim 7, wherein the hard particles are selected from at least one of oxides, carbides, nitrides and phosphides.

9. The process according to claim 1, wherein the material is furthermore mixed with at least one chip-breaking element selected from tellurium, bismuth and sulfur.

10. The process according to claim 1, wherein the mixing is carried out in a ball mill.

11. The process according to claim 1, wherein the material has at least 5% of hard particles of the type $Fe_2P$ and/or $Fe_4P$ having a size of 5<µm.

12. The process according to claim 1, wherein the sliding bearing material is subsequently further processed by sintering, casting and/or roll bonding.

13. The process of claim 1, wherein the total of the at least one element combined with the powder copper-based material is at least 0.2% by weight.

* * * * *

UNITED STATES PATENT AND TRADEMARK OFFICE
CERTIFICATE OF CORRECTION

PATENT NO. : 9,492,868 B2  
APPLICATION NO. : 14/111629  
DATED : November 15, 2016  
INVENTOR(S) : Holger Schmitt and Daniel Meister It is certified that error appears in the above-identified patent and that said Letters Patent is hereby corrected as shown below:

In the Specification

Column 1 Line 22 "prior art" should read -related art-

Signed and Sealed this  
Ninth Day of May, 2017

Michelle K. Lee  
*Director of the United States Patent and Trademark Office*